April 9, 1968

D. LEFEMINE ET AL 3,377,242

NEUTRAMYCIN AND A METHOD FOR PRODUCING
BY USING STREPTOMYCES RIMOSUS

Filed Oct. 9, 1964

INVENTORS
DONALD V. LEFEMINE
MURRAY DANN
SAMUEL OWEN THOMAS
STANLEY EUGENE DE VOE

BY

ATTORNEY

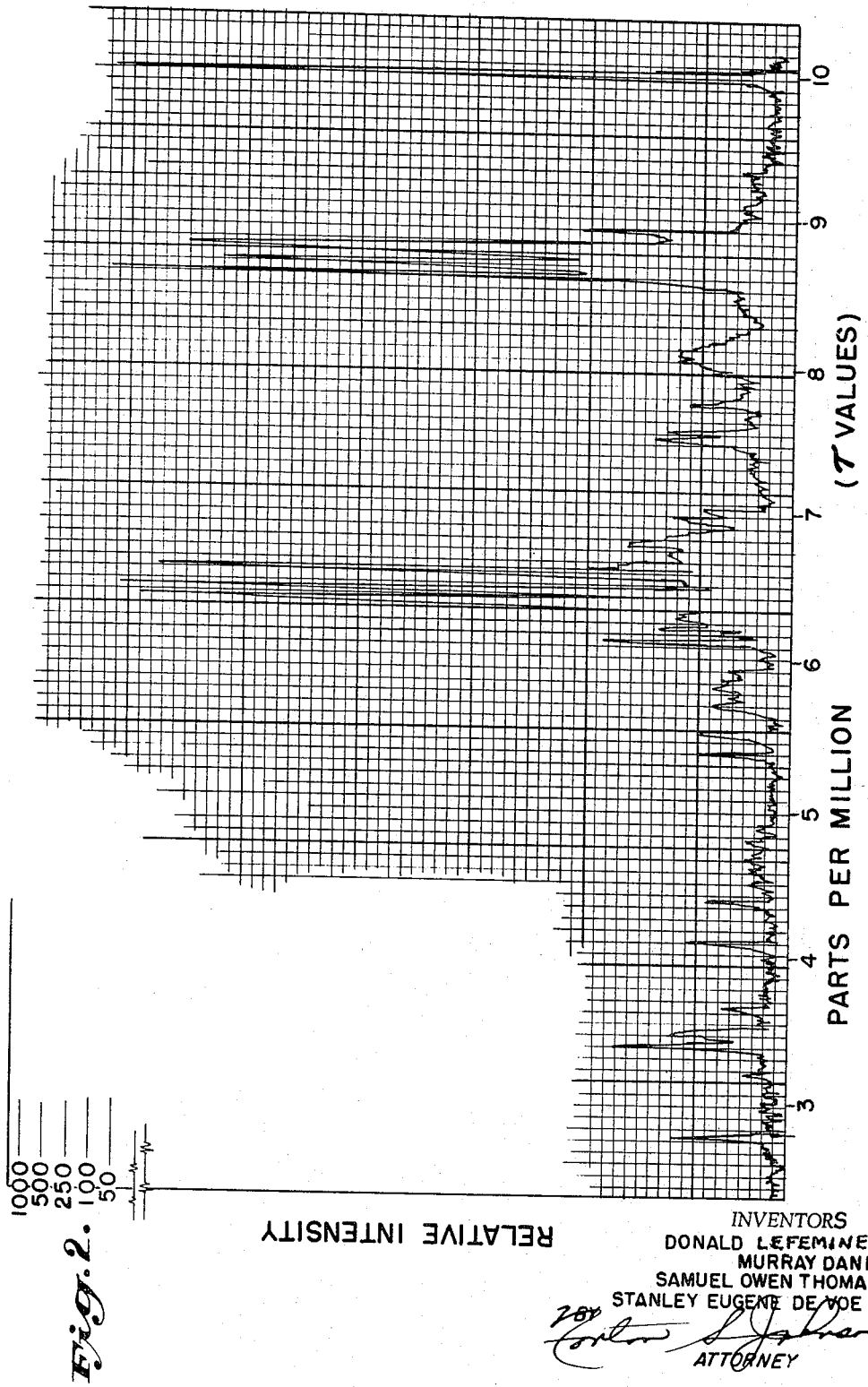

United States Patent Office 3,377,242
Patented Apr. 9, 1968

3,377,242
NEUTRAMYCIN AND A METHOD FOR PRODUCING BY USING *STREPTOMYCES RIMOSUS*
Donald Lefemine, West Nyack, and Murray Dann, Samuel Owen Thomas, and Stanley Eugene De Voe, Pearl River, N.Y., assignors to American Cyanamid Company, Stamford, Conn., a corporation of Maine
Continuation-in-part of abandoned application Ser. No. 303,312, Aug. 20, 1963. This application Oct. 9, 1964, Ser. No. 404,559
7 Claims. (Cl. 167—65)

ABSTRACT OF THE DISCLOSURE

The invention relates to a new antibiotic of unknown configuration produced by fermentation of a new strain of *Streptomyces rimosus*. The novel antibiotic, designated neutramycin, is effective in inhibiting the growth of gram-positive bacteria. The chemical, physical and biological properties of neutramycin are described in detail hereinafter.

---

Figure 1:
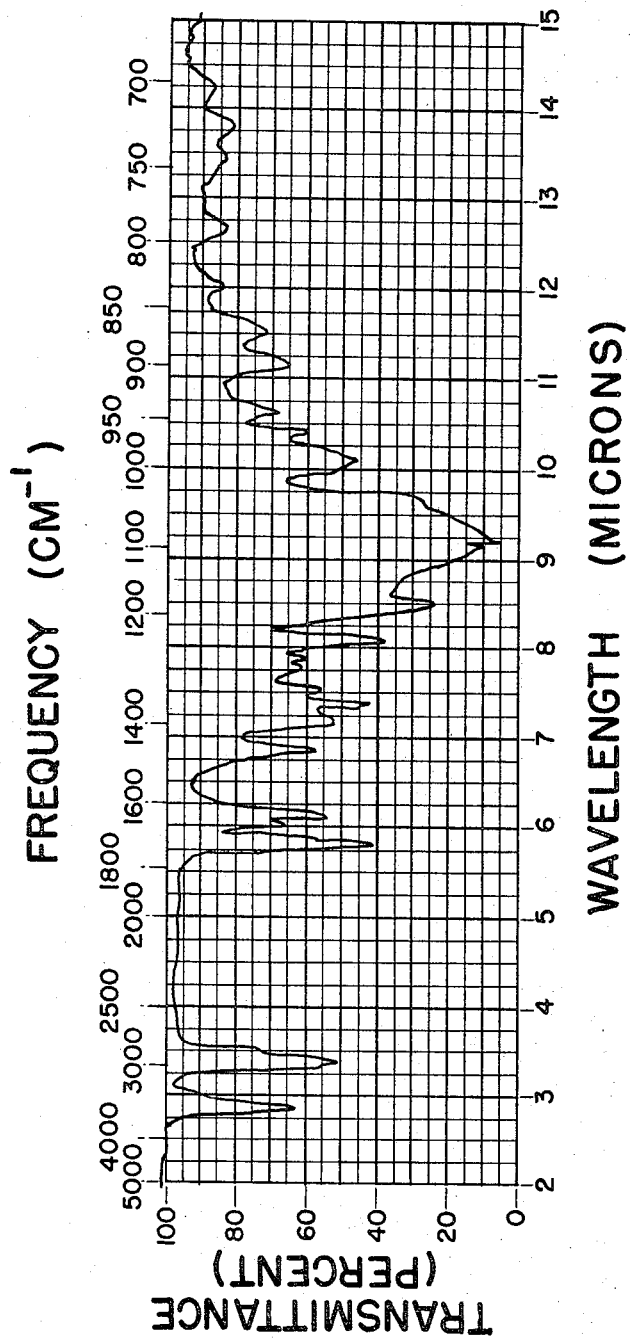

This application is a continuation-in-part of our copending application Ser. No. 303,312, filed Aug. 20, 1963, now abandoned, which application, in turn, is a continuation-in-part of our copending application Ser. No. 228,157, filed Oct. 3, 1962, now abandoned.

This invention relates to a new antibiotic and to its production by fermentation, to methods for its recovery and concentration from crude solutions, and to processes for its purification.

The present invention includes within its scope the antibiotic in dilute forms, as crude concentrates, and in pure crystalline forms. These novel products are active against a variety of microorganisms including Gram-positive bacteria. The effects of the new antibiotic on specific microorganisms together with the chemical and physical properties of the antibiotic differentiate it from previously described antibiotics.

The new antibiotic which we have termed neutramycin (formerly designated AE–705–W) is formed during the cultivation under controlled conditions of a new strain of *Streptomyces rimosus* which was isolated from a soil sample collected in Berhampore, Orissa, India. The following is a general description of the organism based on the diagnostic characteristics observed. The underscored descriptive colors are those of Ridgway (1912) "Color Standards and Color Nomenclature."

Amount of growth.—Moderate to good on most media; colony surfaces generally convoluted or cracked.

Aerial mycelium and/or spore color.—Aerial mycelium and spores white on all media supporting sporulation.

Soluble pigment.—Moderate to abundant, in various shades of brown on most media.

Reverse color.—In various shades of dark brown on most media.

Miscellaneous physiological reactions.—Reduces nitrate to nitrate; liquefies gelatin; and is achromogenic on peptone-iron agar (Difco). Utilizes dextrose, d-xylose, 1-arabinose and d-melezitose well, but shows poor utilization of adonitol, dextran, d-fructose, i-inositol, lactose, d-mannitol, d-raffinose, 1-rhamnose, sucrose, and d-trehalose, and non-utilization of salicin and d-melibiose.

Morphology.—Sporophores arising as long open spirals from aerial mycelium; commonly branched. Spores smooth-walled, globose to elliptical, $0.6$–$0.8\mu$ x $0.7$–$1.0\mu$.

The cultural, morphological, and physiological characteristics of the new strain of *Streptomyces rimosus* are set forth in the following tables. The descriptive colors taken from Ridgway are set in bold type.

TABLE I.—CULTURAL CHARACTERISTICS OF NEW STRAIN OF *S. RIMOSUS*
[Incubation: 14 days; Temperature: 28° C.]

| Medium | Amount of Growth | Aerial Mucelium and Spores | Soluble Pigment | Reverse Color | Remarks |
|---|---|---|---|---|---|
| Czapek's Solution Agar | Good | Aerial mycelium white, scanty. Sporulation very poor. | Hessian Brown; abundant. | Hay's Maroon | Colonies raised, wrinkled. Abundant colorless to pinkish exudate. |
| Tomato Paste Agar | do | Aerial mycelium and spores, white, scanty. Sporulation poor. | Claret Brown; abundant. | Maroon | Colonies raised, wrinkled. Abundant colorless exudate. |
| Bennett's Agar | do | Aerial mycelium and spores white, sparse. Sporulation poor. | Auburn; moderate. | Auburn | Do. |
| Asparagine Dextrose Agar | do | do | Claret Brown; abundant. | Claret Brown | Colonies raised, wrinkled. Abundant colorless to yellowish exudate. |
| Hickey and Tresner's Agar | do | Aerial mycelium and en masse spores white. Sporulation good. | Tawny; moderate. | Tawny | Colonies wrinkled and furrowed Abundant colorless exudate. |
| Carvajal's Oatmeal Agar | Moderate | Aerial mycelium and spores white. Sporulation scanty. | None | Pinkish Cinnamon. | |
| Potato Dextrose Agar | do | Aerial mycelium and spores whitish. Sporulation light. | Claret Brown; abundant. | Maroon | Colonies raised, wrinkled. Moderate brownish exudate. |
| Tomato Paste Oatmeal Agar | Good | Aerial mycelium and en masse sporulation white. Sporulation moderate. | Brownish; light | Chestnut-Brown. | Colonies raised, wrinkled and cracked. |
| Yeast Extract Agar | do | Aerial mycelium and spores whitish. Sporulation light. | Auburn; moderate. | Auburn | Colonies raised, wrinkled. Moderate colorless to yellowish exudate. |
| Inorganic Salts Starch Agar | do | Aerial cycelium and en masse spores white. Sporulation moderate. | None | Cinnamon-Buff. | Colonies raised, wrinkled and cracked. |
| Oat Flake Agar | Moderate | Aerial mycelium and spores white. Sporulation moderate to light. | Hazel; moderate. | Hazel | |

TABLE II.—MORPHOLOGICAL CHARACTERISTICS

| Medium | Aerial Mycelium and Sporiferous Structure | Spore Shape | Spore Size |
|---|---|---|---|
| Inorganic Salts Starch Agar | Sporophores arising as long open spirals from aerial mycelium. Sporophores commonly branched. | Globose to elliptical; smooth-walled | $0.6$–$0.8\mu$ x $0.7$–$1.0\mu$ |

TABLE III.—MISCELLANEOUS PHYSIOLOGICAL TESTS

| Medium | Days | Amount of Growth | Results |
| --- | --- | --- | --- |
| Organic Nitrate | 7 | Good | Nitrates reduced to nitrites. |
| Broth | 14 | do | Do. |
| Synthetic Nitrate | 7 | do | Do. |
| Broth | 14 | do | Do. |
| Gelatin | 7 | do | Partial liquefaction; no pigment. |
| Do | 14 | do | Complete liquefaction; no pigment. |
| Iron-Peptone Agar (Difco). | | do | No chromogenicity. |

TABLE IV.—CARBON SOURCE UTILIZATION
[Pridham-Gottlieb Technique]

| C-source: | Utilization[1] |
| --- | --- |
| Adonitol | 1 |
| 1-arabinose | 3 |
| Dextran | 1 |
| d-Fructose | 1 |
| i-Inositol | 1 |
| Lactose | 1 |
| d-Mannitol | 1 |
| d-Melezitose | 2 |
| d-Melibiose | 0 |
| d-Raffinose | 1 |
| 1-rhamnose | 1 |
| Salicin | 0 |
| Sucrose | 1 |
| d-Trehalose | 1 |
| d-Xylose | 3 |
| Dextrose | 3 |

[1] 0=No utilization. 1=Poor utilization. 2=Fair utilization. 3=Good utilization.

This new strain of *S. rimosus* is a member of the rather small white-spored group of Streptomycetes. The cracking and wrinkling of colonies, the spiralled spore chains and the lack of chromogenicity on peptone-iron agar (Difco), are indicative of the species *S. rimosus*. When compared with the published description of *S. rimosus* [Waksman, "The Actinomycetes," Vol. II Classification, Identification, and Descriptions of Genera and Species, (1961)] and with reference holotypic and syntypic strains of the species, the new strain corresponds closely in all the diagnostic characteristics generally associated with the organism *S. rimosus*. Soluble brown pigments appear to be formed more abundantly by the strain than by most *S. rimosus* cultures; however, this is a variable feature of many Streptomycetes and does not deserve much weight as a taxonomic criterion.

A viable culture of the new strain of *S. rimosus* has been deposited with the Culture Collection Laboratory, Northern Utilization Research and Development Division, United States Department of Agriculture, Peoria, Ill. and has been added to its permanent collection as NRRL 3016.

It is to be understood that for the production of the new antibiotic of this invention, the present invention is not limited to this particular organism or to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

The fermentation process

The cultivation of the new strain of *S. rimosus* may take place in a variety of liquid culture media. Media which are useful for the production of the novel antibiotic include an assimilable source of carbon such as starch, sugar, molasses, glycerol, etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc., are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil may be added as needed.

Shaker flask fermentation

For shaker flask fermentations, 100 milliliter portions of the following liquid inoculum in 500 milliliter flasks are inoculated with an agar slant of the culture.

| Liquid inoculum: | Grams per liter |
| --- | --- |
| Soybean meal | 10 |
| Glucose | 20 |
| Corn steep liquor | 5 |
| Calcium carbonate | 3 |

The flasks are incubated on a reciprocating shaker and agitated vigorously for 24 to 72 hours, usually for 48 hours.

Tank fermentation

For the production of the antibiotic in tank fermentors the following fermentation medium is preferably used.

| Fermentation medium: | Grams per liter |
| --- | --- |
| Bactopeptone | 5 |
| Glucose | 10 |
| Molasses | 20 |
| Calcium carbonate | 1 |

Each tank is inoculated with from 0.1 to 10%, inclusive, of a culture broth fermented as described above for shaker flask fermentation. Aeration is supplied at the rate of 0.2–2.0 volumes, inclusive, of sterile air per volume of broth per minute and the broth is agitated by an impeller driven at about 120–160 r.p.m. The temperature is maintained at 20–35° C. usually at 28° C. The fermentation may be continued for from 24–240 hours, at which time the mash is harvested.

Purification procedure

After the fermentation is completed, the culture broth containing the antibiotic of this invention is preferably filtered at pH 6.0 to remove the mycelium from the broth. Diatomaceous earth or any of the conventional filtration aids may be used to assist the filtration which is carried out using standard equipment. Thereafter, the antibiotic may be recovered from the filtrate by appropriate extraction procedures. Normally the mycelial cake is washed with water and later pooled with filtrate; however, the procedure applied to the filtrate could be utilized on the cake as well.

The antibiotic of this invention may be extracted from the filtrate with ethyl acetate at pH 7.0, concentrated in vacuo to approximately 1/600 of the original volume, and thereafter passed through an aluminum oxide column, using ethyl acetate as a developer. The pooled eluates are then concentrated in vacuo and the resultant residue is dissolved in a minimal volume of ethyl acetate. Thereafter, petroleum ether (30–75° C.) is added slowly to precipitate the antibiotic. The antibiotic is collected via filtration and washed with petroleum ether.

Purification of the antibiotic may be obtained by crystallization from a suitable solvent mixture such as ethyl acetate and petroleum ether (30–75° C.) or ethyl alcohol and petroleum ether (30–75° C.), or alternatively using hot ethyl acetate in a standard manner.

The novel antibiotic of this invention is composed of the elements carbon, hydrogen and oxygen and when dried at 60° C. over $P_2O_5$ in high vacuum for 4–16 hours gives the following average percentages by weight:

| | |
| --- | --- |
| Carbon | 58.63 |
| Hydrogen | 8.09 |
| Oxygen (direct) | 32.42 |

Molecular weight determination using the thermistor technique give values ranging from 513 to 660 (513, 551, 589, 607, 624 and 660); determinations using a single crystal X-ray diffraction technique give a value of 686±5%, and mass spectrographic measurements give a value of 686.

When dried at 100° C. over $P_2O_5$ in high vacuum for 7 days the following percentages are obtained:

| | |
|---|---|
| Carbon | 59.17 |
| Hydrogen | 8.22 |
| Oxygen (by difference) | 32.61 |

A molecular weight determination on this material using the thermistor technique gives a value of 685.

The percent of methyl groups attached to an oxygen is 6.56 (as $CH_3$), and the percent of methyl groups attached to a carbon is 8.08 (as $CH_3$). The product has a melting point of 222–223° C. The product has an optical rotation of $[\alpha]_D^{25°} -34.5°$ (c., 0.987 in ethanol). Ultraviolet maxima at 216 m$\mu$ $$(E_{1\,cm.}^{1\%} = 340)$$

in methanol, shoulder at 240 m$\mu$ $$(E_{1\,cm.}^{1\%} = 205)$$

in methanol.

An infrared absorption spectrum of the new antibiotic is prepared in a standard manner by mixing with crystals of KBr and pressing into a disc. The compound exhibits characteristic absorption in the infrared region of the spectrum at the following wavelengths expressed in microns: 2.86; 3.40, 5.79, 5.88, 6.02, 6.09, 6.85, 7.22, 7.37, 7.52, 7.75, 7.88, 8.10, 8.52, 9.17, 9.22, 9.65, 10.12, 10.32, 10.63, 11.17, 11.52, 12.02, 12.65, 13.45, 13.78, 14.42. The infrared curve is shown in FIGURE 1 of the accompanying drawings.

A proton magnetic resonance spectrum of the antibiotic of this invention is prepared with a Varian HR-60 spectrometer at 60 megacycles in the customary manner by dissolving in deuterochloroform containing tetramethyl silane and chloroform as internal standards. The compound presents a characteristic complex absorption pattern with principal features occurring at the following frequencies expressed in $\tau$ (tau) units: 6.40, 6.45, 6.59, 8.62, 8.70, 8.81. The resonance spectrum is shown in FIGURE 2 of the accompanying drawings.

The product is a neutral compound; it reduces Fehlings solution; it reduces tetrazolium salts and will add bromine (unsaturated). The product has the following approximate solubility characteristics:

TABLE V.—SOLUBILITY DATA

| Solvent: | mg./ml. |
|---|---|
| Diethyl ether | 1 |
| Carbon tetrachloride | 1 |
| Water | 4 |
| n-Amyl acetate | 5 |
| n-Butyl alcohol | 7 |
| n-Propyl alcohol | 11 |
| Methyl isobutyl ketone | 11 |
| Ethyl alcohol | 14 |
| Acetone | 19 |
| Methyl alcohol | 30 |
| Ethyl acetate | 31 |
| Dimethylsulfoxide | 65 |
| Dimethylformamide | >50 |
| Tetrahydrofuran | >50 |
| Chloroform | >250 |

The novel antibiotic is clearly distinguished from other antibiotics by its chemical and physical properties, as described above, and by its antimicrobial spectrum. The specific antimicrobial activity of the antibiotic of this invention is determined by the serial broth dilution assay technique and is presented in the table below which shows the minimal inhibitory concentration required to inhibit the growth of representative microorganisms in tripticase soy broth:

TABLE VI

| Organism: | Minimum inhibitory concentration mcg./ml. |
|---|---|
| Staphylococcus aureus, Strain Smith | 6.2 |
| Staphylococcus aureus, Strain Rose ATCC No. 14,154 | 25 |
| Corynebacterium xerosis, NRRL B-1397 | 3.1 |
| Bacillus subtilis ATCC 6633 | 100 |
| Bacillus cereus, ATCC No. 10,702 | 0.2 |
| Pasteurella multocida ATCC No. 8369 | 25 |
| Streptococcus pyogenes NY 5 | 12.5 |
| Sarcina lutea ATCC No. 9341 | 1.5 |
| Streptococcus pyogenes C 203 | 6.2 |

The novel antibiotic of this invention is active against gram-positive microorganisms, such as, staphylococci, pneumococci, and streptococci. The new antibiotic is thus potentially useful as a therapeutic agent in treating bacterial infections in animals caused by such microorganisms. The new antibiotic can be expected to be usefully employed for controlling such infections by topical application or by parenteral administration.

The usefulness of the novel antibiotic is demonstrated by its ability to control systemic lethal infections in mice. The novel antibiotic of this invention shows substantial antibacterial in vivo activity in mice against Staphylococcus aureus, strain Smith and against Staphylococcus aureus, strain Rose when administered to groups of Carworth Farms CF-1 male mice, weight 18–22 grams, infected with a lethal dose of a broth dilution of a five-hour, TSP blood broth culture of these organisms.

Table VII below shows the in vivo antibacterial activity of the new antibiotic.

TABLE VII.—IN VIVO ANTIBACTERIAL ACTIVITY OF NEUTRAMYCIN

| Test System | Dosage, mg./kg. of body wt. | Survivors/Total | |
|---|---|---|---|
| | | S.O.D.[1] | S.S.C.[2] |
| Staphylococcus aurens, strain Smith | 320 | 9/10 | 10/10 |
| | 160 | 19/30 | 23/30 |
| | 80 | 8/30 | 12/30 |
| | 40 | 8/30 | 4/30 |
| | 20 | 6/30 | 4/30 |
| | 10 | 4/30 | 1/30 |
| Staphylococcus aureus, strain Rose | 1,280 | 10/10 | |
| | 640 | 19/20 | |
| | 320 | 26/40 | 19/20 |
| | 160 | 30/40 | 15/20 |
| | 80 | 17/40 | 19/30 |
| | 40 | 10/40 | 13/30 |
| | 20 | 9/40 | 8/30 |
| | 10 | 0/20 | 8/30 |
| | 5 | | 2/30 |
| | 2.5 | | 1/20 |

[1] S.O.D.=Single Oral Dose.
[2] S.S.C.=Single Subcutaneous Dose.
All of the infected non-treated controls died within one day.

The invention will be described in greater detail in conjunction with the following specific examples.

EXAMPLE 1.—Inoculum preparation

A typical medium used to grow the primary inoculum is prepared according to the following formula:

| | Grams |
|---|---|
| Soybean meal | 10 |
| Glucose | 20 |
| Corn steep liquor | 5 |
| Calcium carbonate | 3 |
| Water to 1000 milliliters. | |

A yeast malt agar slant of a culture of the new strain of S. rimosus is incubated for a week. At this time the spores and mycelium are transferred to two 500 milliliter flasks which contain 100 milliliters of the above medium.

The flasks are placed on a reciprocating shaker and agitated vigorously for 48 hours, at 28° C. The flask inocula are transferred to 9 liter bottles which contain 6 liters of the above liquid medium. These bottles are aerated for 24 hours to encourage further growth. At the end of this time the 9 liter bottles are used to seed fermentor tanks.

Example 2

A fermentation medium is prepared according to the following formula:

| | Grams |
|---|---|
| Bactopeptone | 5 |
| Glucose | 10 |
| Molasses | 20 |
| Calcium carbonate | 1 |
| Water to 1000 milliliters. | |

The fermentation medium is sterilized at 120° C. with steam at 15 pounds pressure for 60 minutes. The pH of the medium before and after sterilization is between 7.0 and 7.8. 1500 liters of the sterile medium in 1000 gallon fermentors are inoculated with 12 liters of the bottle inoculum described above and the fermentation is carried out at 28° C. for 90 hours. The medium is agitated by an impeller operating at 100 revolutions per minute. At the end of the fermentation the mash is assayed.

Example 3.—Isolation

Sixteen hundred liters of fermented mash, to which diatomaceous earth is added in the proportion 2% weight/volume, is filtered. The filter pad is washed with $\frac{1}{10}$ volume of water and the pad then discarded. The pooled water wash and filtrate (volume 1600 liters) is then adjusted to pH 7.0, saturated with ethyl acetate and extracted in a three-stage countercurrent extractor with ethyl acetate using 0.75 volume of solvent per volume of aqueous phase. The pooled ethyl acetate extract (volume 1350 liters) is concentrated in vacuo to approximately $\frac{1}{800}$ of the volume. The ethyl acetate concentrate is then poured onto an aluminum oxide (chromatographic grade) column. The adsorption column is then developed with ethyl acetate to elute the desired antibiotic activity.

The effluents from the column are pooled using the following criteria:

(1) In vitro data.—Agar diffusion plate method of assay using *Bacillus cereus*, *Corynebacterium xerosis* and *Staphylococcus aureus* as the test organisms.

(2) Paper chromatography.—Using Whatman No. 1 paper and a solvent system consisting of n-amyl acetate, dibutyl ether, glacial acetic acid and water.

(3) Microscopic observation of concentrated aliquots of effluents.

Based upon these criteria similar fractions are pooled and concentrated in vacuo to a dark, brownish-yellow oily residue. The concentrate is dissolved in a minimal volume of ethyl acetate and then petroleum ether (30–75° C.) is added slowly, precipitating the product as an off-white crystal. The crystals are collected via filtration and washed using petroleum ether (30–75° C.). Yield 12.5 grams. The product is recrystallized using ethyl acetate plus petroleum ether (30–75° C.) and dried in vacuo over phosphorous pentoxide at 60° C. Alternative crystallization solvents are ethyl alcohol plus petroleum ether (30–75° C.), chloroform plus petroleum ether (30–75° C.), methyl alcohol plus diethyl ether, hot water, hot ethyl alcohol, or hot ethyl acetate. The chemical analysis of this product and its other chemical, physical, and biological properties have already been described.

EXAMPLE 4.—Preparation of acetyl derivative of the new antibiotic

Five hundred milligrams of the product prepared according to Example 3 is added to 7.2 milliliter of dry acetic anhydride plus 7.2 ml. of dry pyridine, and kept at room temperature for 20 hours. The mixture is then concentrated in vacuo to a yellow oil. The oil is dissolved in chloroform and added to an aluminum oxide column (30 grams aluminum oxide) and developed with chloroform. The acetate effluent is collected and concentrated to an oily residue. The oil containing acetate is then crystallized three times using acetone and petroleum ether (30–75° C.), yielding 250 milligrams of the white, needle-like crystalline acetate. The sample was dried for 4 hours at 60° C. over $P_2O_5$ in high vacuum prior to analysis.

Elemental analysis: C, 58.60; H, 7.88; O, (direct) 32.40. Melting point 123–125° C. Optical rotation $[\alpha]_D^{25°}$ —9.3° (c., 0.862 in ethanol). Ultraviolet maxima at 216 m$\mu$ $$(E_{1cm.}^{1\%} = 300)$$

in methanol, shoulder at 240 m$\mu$.

$$(E_{1cm.}^{1\%} = 168)$$

in methanol.

We claim:

1. Neutramycin, a substance effective in inhibiting the growth of gram-positive bacteria and being characterized by the following properties:

(a) a melting point of 222–223° C.,
(b) an optical rotation $[\alpha]_D^{25} = -34.5$ (c.=0.987% in ethanol),
(c) containing the elements carbon, hydrogen, and oxygen in substantially the following percentages by weight when dried under normal conditions:

| | |
|---|---|
| Carbon | 58.63 |
| Hydrogen | 8.09 |
| Oxygen (direct) | 32.42 |

(d) having the following elemental analysis when dried for one week over $P_2O_5$ at 100° C. under reduced pressure:

| | |
|---|---|
| Carbon | 59.17 |
| Hydrogen | 8.22 |

(e) a molecular weight determination of 513–686,
(f) characteristic absorption in the ultraviolet region of the spectrum at 216 m$\mu$ $$(E_{1cm.}^{1\%} = 340)$$

in methanol and a shoulder at 240 m$\mu$ $$(E_{1cm.}^{1\%} = 205)$$

in methanol,
(g) characteristic absorption in the infrared region as shown in FIGURE 1 and,
(h) a proton resonance spectrum as shown in FIGURE 2.

2. The acetyl derivative of the substance defined in claim 1.

3. A process for the production of neutramycin which comprises cultivating a neutramycin producing strain of *Streptomyces rimosus* NRRL No. 3016 in an aqueous nutrient medium containing assimilable sources of carbohydrate, nitrogen, and inorganic salts under submerged aeroboic conditions until substantially antibacterial activity due to neutramycin is imparted to said medium.

4. A process for the production of neutramycin which comprises cultivating *Streptomyces rimosus* NRRL No. 3016 in an aqueous nutrient medium containing assemilable sources of carbohydrate, nitrogen and inorganic salts under submerged aerobic conditions for a period of from 24 to 240 hours, and at a temperature of from 20 to 35° C., and recovering the antibiotic so produced.

5. A process as in claim 4 in which the antibiotic is recovered from the fermentation broth by filtering the broth, extracting the antibiotic activity from the beer filtrate with a solvent, passing the antibiotic activity through a chromatographic column, and separating the antibiotic activity therefrom.

6. A composition of matter consisting of the substance according to claim 1 in the crystalline state.

7. A therapeutic composition of matter containing as an essential antibacterial agent a compound as characterized in claim 1, and a pharmaceutical carrier.

References Cited

UNITED STATES PATENTS 2,516,080   7/1950   Sobin et al. _____ 167—65

ALBERT T. MYERS, *Primary Examiner.*

D. M. STEPHENS, *Assistant Examiner.*